(12) United States Patent
Picard

(10) Patent No.: US 9,005,451 B2
(45) Date of Patent: Apr. 14, 2015

(54) METHOD AND DEVICE FOR TREATING AN EFFLUENT

(75) Inventor: Alain Picard, Gieres (FR)

(73) Assignee: Sud est Eau Pure, Nice (FR)

( * ) Notice: Subject to any disclaimer, the term of this patent is extended or adjusted under 35 U.S.C. 154(b) by 951 days.

(21) Appl. No.: 12/742,389

(22) PCT Filed: Nov. 7, 2008

(86) PCT No.: PCT/FR2008/052014
§ 371 (c)(1),
(2), (4) Date: Aug. 9, 2010

(87) PCT Pub. No.: WO2009/068797
PCT Pub. Date: Jun. 4, 2009

(65) Prior Publication Data
US 2010/0314330 A1 Dec. 16, 2010

(30) Foreign Application Priority Data

Nov. 13, 2007 (FR) ...................................... 07 59002

(51) Int. Cl.
| | | |
|---|---|---|
| C02F 1/00 | (2006.01) | |
| C02F 1/30 | (2006.01) | |
| B67D 7/76 | (2010.01) | |
| C02F 1/32 | (2006.01) | |

(52) U.S. Cl.
CPC ........... *C02F 1/325* (2013.01); *C02F 2201/326* (2013.01); *C02F 2209/40* (2013.01); *C02F 2209/42* (2013.01)

(58) Field of Classification Search
None
See application file for complete search history.

(56) References Cited

U.S. PATENT DOCUMENTS

| | | | | |
|---|---|---|---|---|
| 3,578,005 A | * | 5/1971 | Jurion et al. | 137/3 |
| 3,779,913 A | * | 12/1973 | Martin | 210/758 |
| 4,975,154 A | * | 12/1990 | Palmer et al. | 203/1 |
| 5,294,916 A | * | 3/1994 | Bolton et al. | 340/606 |
| 5,560,821 A | * | 10/1996 | Leo et al. | 210/143 |
| 6,379,632 B1 | * | 4/2002 | Kinoshita et al. | 422/300 |
| 2003/0132250 A1 | | 7/2003 | Greene | |
| 2003/0201225 A1 | * | 10/2003 | Josse et al. | 210/605 |
| 2005/0263447 A1 | * | 12/2005 | McGrew | 210/205 |
| 2010/0018913 A1 | | 1/2010 | Blum | |

FOREIGN PATENT DOCUMENTS

| | | |
|---|---|---|
| FR | 2840894 | 12/2003 |
| JP | 63-252248 | 10/1988 |

OTHER PUBLICATIONS

International Search Report for PCT/FR2008/052014 issued Jul. 1, 2008.
Written Opinion for PCT/FR2008/052014 issued Jul. 1, 2008.
International Report on Patentability for PCT/FR2008/052014 issued Jun. 29, 2010.

* cited by examiner

*Primary Examiner* — Nam Nguyen
*Assistant Examiner* — Richard Gurtowski
(74) *Attorney, Agent, or Firm* — Meyertons, Hood, Kivlin & Goetzel, P.C.; Eric B. Meyertons

(57) ABSTRACT

Method and device for treating a liquid effluent, in which this effluent enters a vessel. An intermediate level of liquid in the vessel is detected; an influx of a dilution liquid into the vessel is instigated; a high level of liquid in the vessel is detected; the influx of dilution liquid is stopped and a discharge of the fluid is instigated; a low level of liquid in the vessel is detected; the discharge of the liquid is stopped; and, while it is being discharged, the discharged liquid is exposed to light radiation in at least one treatment channel.

9 Claims, 4 Drawing Sheets

METHOD AND DEVICE FOR TREATING AN EFFLUENT

BACKGROUND OF THE INVENTION

1. Field of the Invention

The present invention relates to the field of the treatment of effluent with a view to discharging depollutant or decontaminated water into, for example, the waste water networks.

2. Description of the Relevant Art

Treatment of effluent is encountered when treating hospital waste from, in particular, human or animal biology analysis equipment or waste from, in particular, food product analysis equipment, the purpose being to destroy all kinds of pollutants such as bacteria, viruses, molds or fungi.

Patent FR-A-2 840 894 proposes to treat liquid effluent firstly using a filtration cartridge and secondly by exposing this effluent to irradiation with ultraviolet light, with the liquid effluent simply being stored in an intermediate tank from which the liquid effluent is discharged using a pump.

SUMMARY OF THE INVENTION

Embodiments herein describe an improved and more autonomous treatment of liquid effluent.

In one embodiment a method for treating a liquid effluent, in which this effluent enters a vessel, includes:
  detecting an intermediate level of liquid in the vessel;
  upon detection of the intermediate level, instigating an influx of a dilution liquid into the vessel;
  detecting a high level of liquid in the vessel;
  upon detection of the high level, stopping the influx of dilution liquid and instigating a discharge of the fluid;
  detecting a low level of liquid in the vessel;
  upon or following detection of the low level, stopping the discharge of the liquid;
  and, while it is being discharged, exposing the discharged liquid to light radiation in at least one treatment channel.

According to an embodiment, the method may include:
  discharging, via the treatment channel, any liquid that is at an overflow level above the high level and exposing the overflow liquid to light radiation.

According to an embodiment, the method may include:
  instigating a secondary influx of dilution liquid into the vessel from a low level;
  detecting an intermediate low level of liquid in the vessel;
  upon detection of the intermediate low level, stopping the secondary influx of dilution liquid.

According to an embodiment, the stopping of the discharge of the liquid may be offset by a set length of time in relation to the detection of the low level.

In another embodiment, a device for treating a liquid effluent includes a vessel; an influx pipe carrying the liquid effluent that is to be treated; an influx pipe carrying a dilution liquid under pressure and fitted with an electrically operated valve; a probe sensing a high level of liquid in the vessel; a probe sensing an intermediate level of liquid in the vessel; a probe sensing a low level of liquid in the vessel; a discharge pipe on which there are installed, from the upstream direction downstream, a flow regulating means and a means of exposing the discharged fluid to light radiation; an electronic circuit for controlling the electrically operated valve and the flow regulating means and subject to the signals from the level probes.

In an embodiment, the flow regulating means may include a pump and an electrically operated valve.

In an embodiment, the treatment device may include a probe for sensing an intermediate low level.

In an embodiment, the treatment device may include an overflow pipe the inlet of which is situated above the high level and which is connected directly to the inlet of the exposure means.

In an embodiment, the vessel may be fitted with a nonreturn valve allowing air to enter.

In an embodiment, the probes may be fixed to an upper wall of the vessel and include stems which run vertically.

In an embodiment, the exposure means may include at least two coaxial cylindrical tubes defining a treatment channel in which the discharged liquid can flow approximately longitudinally and at least one lamp emitting light radiation which runs longitudinally along the inner tube.

BRIEF DESCRIPTION OF THE DRAWINGS

The present invention will be better understood from studying a device for treating effluent and the operation thereof, which are described by way of nonlimiting example and illustrated by the drawing in which.

Figure 1:
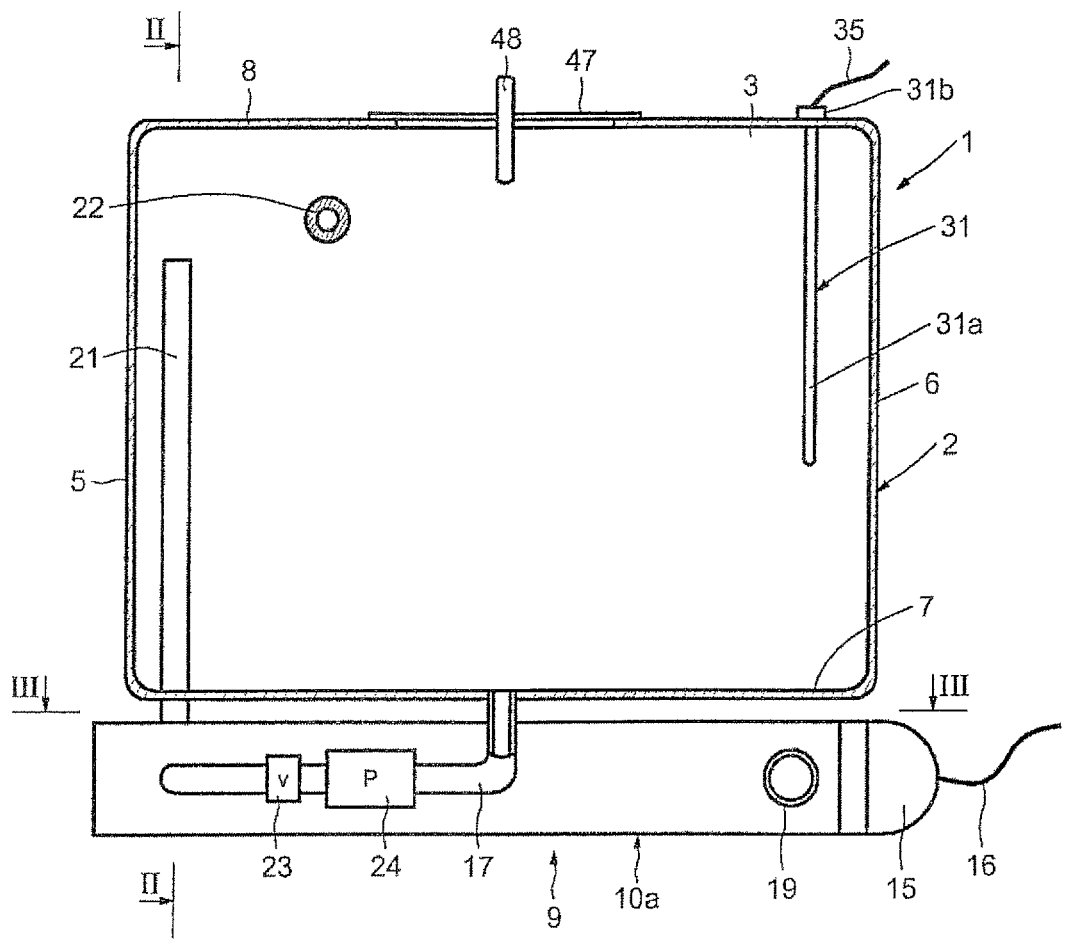
FIG. 1 depicts a view in longitudinal section on I-I of FIG. 2, of a treatment device.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

Figure 2:
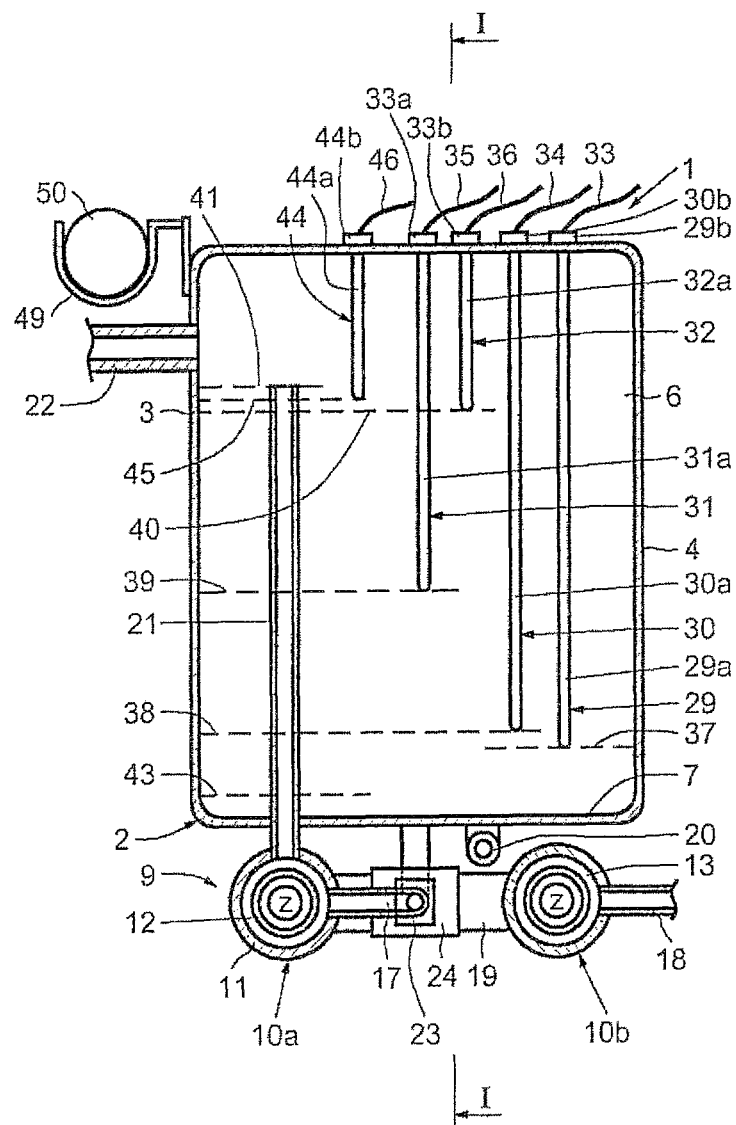
FIG. 2 depicts a view in cross section on II-II of the treatment device of FIG. 1.
Figure 3:
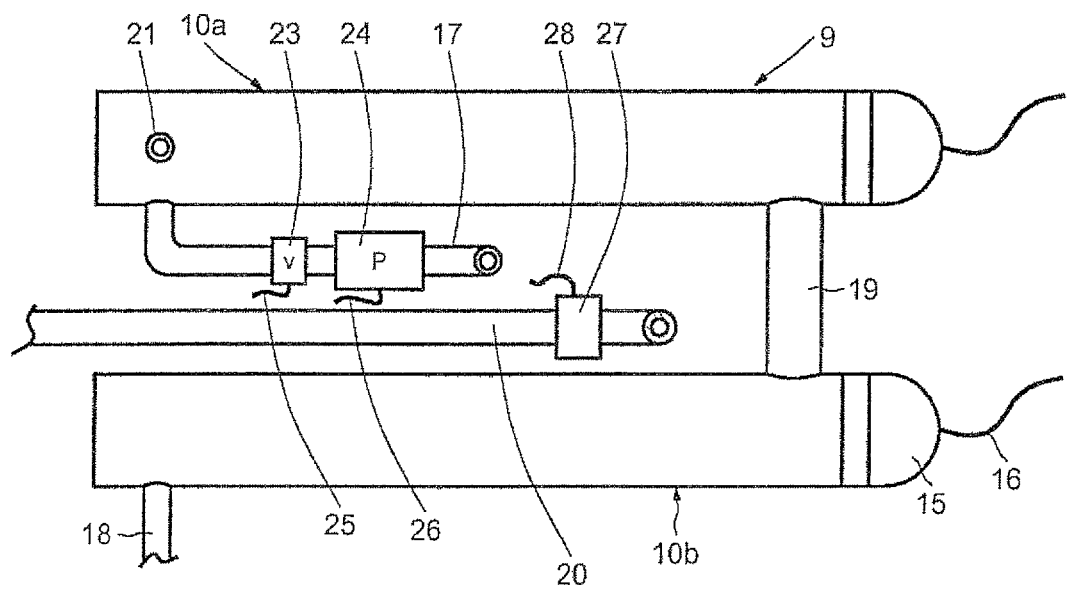
FIG. 3 depicts a view in horizontal section on of the treatment device of FIG. 1, under the vessel.

The liquid effluent treatment device 1 depicted in FIGS. 1 to 3 includes a parallelepipedal metal vessel 2 which has longitudinal walls 3 and 4, transverse walls 5 and 6, a lower wall or bottom 7 and an upper wall 8.

Positioned beneath the vessel 2, the treatment device 1 includes a treatment means 9 which includes two longitudinal treatment members 10a and 10b, on each side of the lower wall 7, and mounted in series.

The treatment members respectively include a metal outer tube 11 and a transparent coaxial tube 12 made of quartz, between them defining an annular exposure channel 13 and a longitudinal lamp 14 emitting ultraviolet light radiation, running cantilever fashion into the inner tube 12 and supported by an end plug 15 from which a power supply lead 16 emerges.

One of the lateral ends of the exposure member 10a is connected to the bottom 7 of the vessel 2 by a pipe 17 such that its annular exposure channel 13 is in communication with the vessel 2, more or less at the middle thereof.

The corresponding end of the treatment member 10b is equipped with a lateral discharge pipe 18 linking its annular exposure channel 13 by natural flow to a waste water network for example.

The other ends of the treatment members 10a and 10b are connected laterally, by a transverse pipe 19, placing their annular exposure channels 13 in communication and in series.

Underneath the vessel 2, the treatment device 1 includes an influx pipe 20 carrying a dilution liquid into the vessel 2, through the lower wall 7 thereof, this pipe 20 being, for example, connected to a pressurized domestic water supply network.

The treatment device 1 also includes a vertical overflow pipe 21 which runs vertically through the vessel 2, which passes through the bottom 7 thereof and which is connected to the end of the treatment member 10a that corresponds to the end at which the pipe 17 is connected. The upper end of the overflow pipe 21 is located in the upper part of the vessel 2.

The wall 3 of the vessel 2 is equipped with an influx pipe 22 carrying an effluent that is to be treated.

Provided on the pipe 17 are an electrically operated valve 23 and a pump 24, from which electrical connection leads 25 and 26 emerge.

Provided on the pipe 20 is an electrically operated valve 27 from which an electrical connection lead 28 emerges.

The treatment device 1 includes four level sensing probes 29, 30, 31 and 32 which extend down into the vessel 2 from the upper wall 8 thereof and which respectively have stems 29a, 30a, 31a and 32a and washers 29b, 30b, 31b and 32b fixed to the exterior face of the upper wall 8 removably, for example using threaded fasteners, the probes being equipped with electrical connection leads 33, 34, 35 and 36.

The lower end of the stem 29a of the probe 29 defines a low level 42 in the vessel 2.

The lower end of the stem 30a of the probe 30 defines an intermediate low level 38 in the vessel 2.

The lower end of the stem 31a of the probe 31 defines an intermediate level 39 in the vessel 2.

The lower end of the stem 32a of the probe 32 defines a high level 40 in the vessel 2, which level is located slightly below an overflow level 41 defined by the upper end of the overflow pipe 21.

The effluent influx pipe 22 is positioned in such a way as to open into the vessel 2 at a level higher than the level of the overflow 41.

Figure 4:
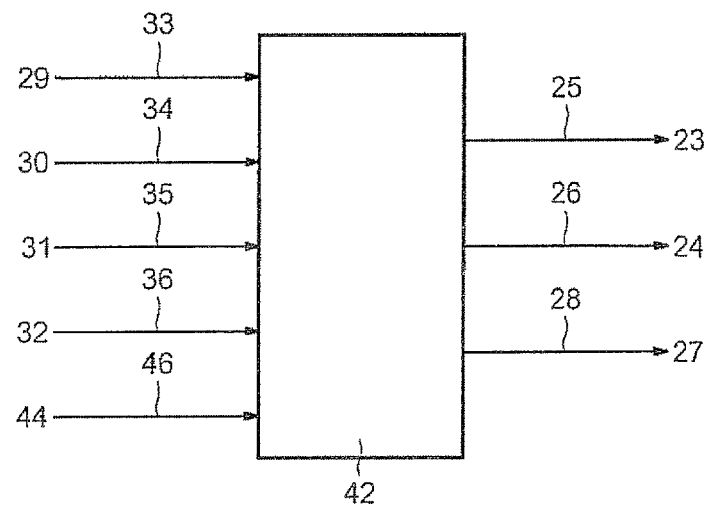
FIG. 4 depicts an associated electronic control circuit.

As shown by FIG. 4, the treatment device 1 also includes an electronic circuit 42 which is connected to the level probes 29, 30, 31 and 32 by the electrical connection leads 33, 34, 35 and 36 and which is connected to the electrically operated valves 23 and 27 by the electrical connection leads 25 and 28 and to the pump 24 by the electrical connection wire 26.

Moreover, the lamps 14 are connected to the electronic circuit 42 so that they can be powered with electricity.

The electronic circuit 42 is programmed in such a way as to operate the treatment device 1 as follows.

It is assumed that the electronic circuit 42 is in operation and that the lamps 14 are illuminated.

On start up, the electronic circuit 42 instigates the opening of the electrically operated valve 27 so as to carry an influx of dilution liquid into the vessel 2.

When the level of liquid in the vessel 2 reaches the intermediate low level 38, the electronic circuit 42 instigates the closing of the electrically operated valve 27.

The effluent carried into the vessel 2 by the influx pipe 22 fills this vessel little by little and becomes mixed in with the dilution liquid.

When the level of liquid in the vessel 2 reaches the intermediate level 39, the probe 26 detects this level and sends a corresponding signal to the electronic circuit 42. The latter then orders the opening of the electrically operated valve 27 so as to introduce dilution liquid into the vessel 2.

When the liquid contained in the vessel 2 reaches the high level 40, the probe 27 detects this level and transmits a corresponding signal to the electronic circuit 42 which instigates closure of the electrically operated valve 27 followed by opening the electrically operated valve 23 and the starting of the pump 24.

The liquid contained in the vessel 2 is then discharged from the vessel 2 via the pipe 17, the channel 13 of the member 10a, the connecting pipe 19, the channel 13 of the member 10b and finally the end pipe 18.

When the level of liquid in the vessel 2 reaches the low level 37, the electronic circuit 42 instigates the stopping of the pump 24 and the closing of the electrically operated valve 23, with a temporal offset of a duration such that the level of liquid in the vessel 2 reaches a bottom low level 43 near the lower wall 7 or is completely discharged.

The electronic circuit 42 then instigates the opening of the electrically operated valve 27 so as to bring about a secondary influx of dilution liquid into the vessel 2.

When the level of the dilution liquid reaches the intermediate low level 38, the electronic circuit 42 instigates the closing of the electrically operated valve 27.

When effluent is carried into the vessel 2, the level of liquid contained in this vessel rises and the cycle that has just been described recommences starting from the level 38.

When the liquid discharged from the vessel 2 passes through the exposure channels 13 of the treatment members 10a and 10b, it undergoes a decontamination treatment through being exposed to the ultraviolet light radiation from the lamps 14.

In an alternative form, the lamps 14 may be permanently illuminated.

In another, more economical, alternative form, upon detection of the intermediate level 39, the electronic circuit 42 instigates the illuminating of the lamps 14 and, when the low level 43 is reached, the electronic circuit 42 instigates the switching-off of the lamps 14. Of course, the time spent conveying the dilution fluid that raises the level from the intermediate level 39 to the high level 40 must be long enough for the lamps 14 to warm up. To ensure that, the length of time for which the dilution fluid is supplied may be set by setting the electrically operated valve 27 or by providing a flow limiter on the influx pipe 20.

Moreover, the treatment device may include a safety probe 44 including a vertical stem 44a and a washer 44b for mounting on the wall 8 and defining a safety level 45 situated between the high level 40 and the overflow level 41, this safety probe 44 being connected to the electronic circuit 42 by a line 46.

When the fluid in the vessel 2 reaches the safety level, the electronic circuit 42 may trigger an audible and/or luminous alarm and force the closing of the electrically operated valve 27.

The treatment device just described has the following advantages.

The influx of dilution liquid between the levels 39 and 40 allows the effluent to be diluted and therefore allows more effective treatment thereof via the members 10a and 10b.

The pump 24 is able to regulate the rate at which the liquid is discharged and thus ensure a controlled length of exposure in the members 10a and 10b.

The electronic circuit 42 may be programmed to regulate actuation of the pump 24 to ensure different rates of flow suited to the particular effluent that is to be treated.

Because of the way in which they are mounted, the probes 29 to 32 can be changed, independently of one another, so as to define different associated levels, for example according to the particular effluent that is to be treated.

In particular, the probe 31 can be interchanged to adapt the intermediate level to suit the particular effluent to be treated. As was seen above, it is this probe 31 that determines the dilution ratio, according to the relative positions of the intermediate level 39, of the high level 40 and of the low level 43.

Specifically, the dilution ratio defined by the probes 39, 40 and 43 and the discharge flow rate defined by the pump 24 need to be adapted to ensure that the treatment of the effluent to be treated is as effective as possible and destroys the pollutants. It may be seen that, depending on the effluent that is to be treated, the dilution ratio, defined as being a ratio between the volume of water added between the levels 39 and 40 and the volume of effluent poured into the vessel between the levels 38 and 39 may range between 0 and 50, more specifically between 0.2 and 30.

If the level of liquid in the vessel 2 exceeds the high level 40 and reaches the upper level 41, the overflow is discharged through the overflow pipe 21 directly through the members 10a and 10b without passing through the pipe 17 governed by the electrically operated valve 23 and the pump 24, undergoing decontamination treatment through these members 10a and 10b under the effect of the lamps 14.

The fact that there is a bottom low level 38 and influxes of dilution liquid more or less ensures cleaning of the ends of the probes.

Furthermore, the electronic circuit 42 may be programmed also to carry out treatment cycles that are imposed at predetermined, possibly adjustable times, for example every three or four hours, in case the amount of effluent admitted to the vessel 2 should become scarce. Should this happen, the electronic circuit 42 would instigate the influx of the dilution fluid up to the high level 40 even if the level in the vessel was below the intermediate level 39, and would then instigate discharge, as described earlier.

An imposed treatment cycle may also be scheduled in the event of a loss of power, as soon as this power is reinstated.

As shown by FIG. 1, the wall 8 of the vessel 2 may have an inspection hatch 47 fitted with a nonreturn valve 48 to allow air to enter the vessel 2 while preventing gases contained in the vessel from being discharged to the outside.

As FIG. 2 shows, the wall 3 of the vessel 2 may be provided with a horizontal external support 49 to accept a cartridge 50 for chemical treatment and/or filtering of the effluent, before the effluent is carried into the vessel 2, this cartridge being positioned above the level of the inlet 22 to prevent backflushing with effluent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method of treating a liquid effluent, in which this effluent enters a vessel comprising:

introducing a liquid effluent comprising biological pollutants into the vessel, wherein the biological pollutants comprise one or more bacteria, viruses, molds, or fungi;

detecting an intermediate level of liquid in the vessel due to the introduction of liquid effluent into the vessel;

upon detection of the intermediate level, instigating an influx of a dilution liquid into the vessel, wherein the dilution liquid has a lower concentration of biological pollutants than the liquid effluent, and wherein addition of the dilution liquid reduces a concentration of biological pollutants in the liquid in the vessel detecting a high level of liquid in the vessel due to introduction of the dilution liquid in the vessel;

upon detection of the high level, stopping the influx of dilution liquid and instigating a discharge of the liquid in the vessel while liquid is being discharged from the vessel, exposing the discharged liquid to light radiation in at least one treatment channel to destroy pollutants in the liquid being discharged discharging, via the treatment channel, any liquid that is at an overflow level above the high level and exposing the overflow liquid to light radiation;

detecting a low level of liquid in the vessel, wherein the low level is lower than the intermediate level;

upon or following detection of the low level, stopping the discharge of the liquid in the vessel and introducing a liquid effluent comprising the biological pollutants repeating the intermediate level detection step, the high level detection step, and the low level detection steps, and actions associated with these steps, as liquids are introduced into the vessel and discharged from the vessel.

2. The treatment method as claimed in claim 1, comprising: instigating a secondary influx of dilution liquid into the vessel from a low level;

detecting an intermediate low level of liquid in the vessel;

upon detection of the intermediate low level, stopping the secondary influx of dilution liquid.

3. The treatment method as claimed in claim 1, in which the stopping of the discharge of the liquid is offset by a set length of time in relation to the detection of the low level.

4. A device for treating a liquid effluent, comprising:

a vessel;

an influx pipe carrying the liquid effluent that is to be treated;

an influx pipe carrying a dilution liquid under pressure and fitted with an electrically operated valve;

a probe sensing a high level of liquid in the vessel;

a probe sensing an intermediate level of liquid in the vessel;

a probe sensing a low level of liquid in the vessel;

a Discharge pipe on which there are installed, from the upstream direction downstream, a flow regulating means and a means of exposing discharged liquid to light radiation an electronic circuit for controlling the electrically operated valve and the flow regulating means and subject to the signals from the level probes, wherein the electronic circuit includes program instructions for performing a method comprising an irradiation system comprising a treatment channel and a source of light capable of destroying biological pollutants;

an overflow pipe the inlet of which is situated above the high level and which is connected directly to treatment channel;

introducing a liquid effluent comprising biological pollutants into the vessel, wherein the biological pollutants comprise one or more bacteria, viruses, molds, or fungi;

detecting an intermediate level of liquid in the vessel due to the introduction of liquid effluent into the vessel;

upon detection of the intermediate level, instigating an influx of a dilution liquid into the vessel, wherein the dilution liquid has a lower concentration of biological pollutants than the liquid effluent, and wherein addition of the dilution liquid reduces a concentration of biological pollutants in the liquid in the vessel detecting a high level of liquid in the vessel due to introduction of the dilution liquid in the vessel;

upon detection of the high level, stopping the influx of dilution liquid and instigating a discharge of the liquid in the vessel while liquid is being discharged from the vessel, exposing the discharged liquid to light radiation in at least one treatment channel to destroy pollutants in the liquid being discharged discharging, via the treatment channel, any liquid that is at an overflow level above the high level and exposing the overflow liquid to light radiation;

detecting a low level of liquid in the vessel, wherein the low level is lower than the intermediate level;

upon or following detection of the low level, stopping the discharge of the liquid in the vessel and introducing a liquid effluent comprising the biological pollutants repeating the intermediate level detection step, the high level detection step, and the low level detection steps, and actions associated with these steps, as liquids are introduced into the vessel and discharged from the vessel.

5. The treatment device as claimed in claim 4, in which the flow regulating means comprises a pump and an electrically operated valve.

6. The treatment device as claimed in claim 4, further comprising a probe that senses an intermediate low level.

7. The treatment device as claimed in claim 4, in which the vessel is fitted with a nonreturn valve that allows air to enter.

8. The treatment device as claimed in claim 4, in which the probes are fixed to an upper wall of the vessel and comprise stems which run vertically.

9. The treatment device as claimed in claim 4, in which the exposure means comprises at least two coaxial cylindrical tubes defining a treatment channel in which the discharged liquid can flow approximately longitudinally and at least one lamp emitting light radiation which runs longitudinally along the inner tube.

* * * * *